Jan. 10, 1928.
A. KAMERMAN
1,656,068
LIQUID LEVEL GAUGE
Filed June 6, 1923
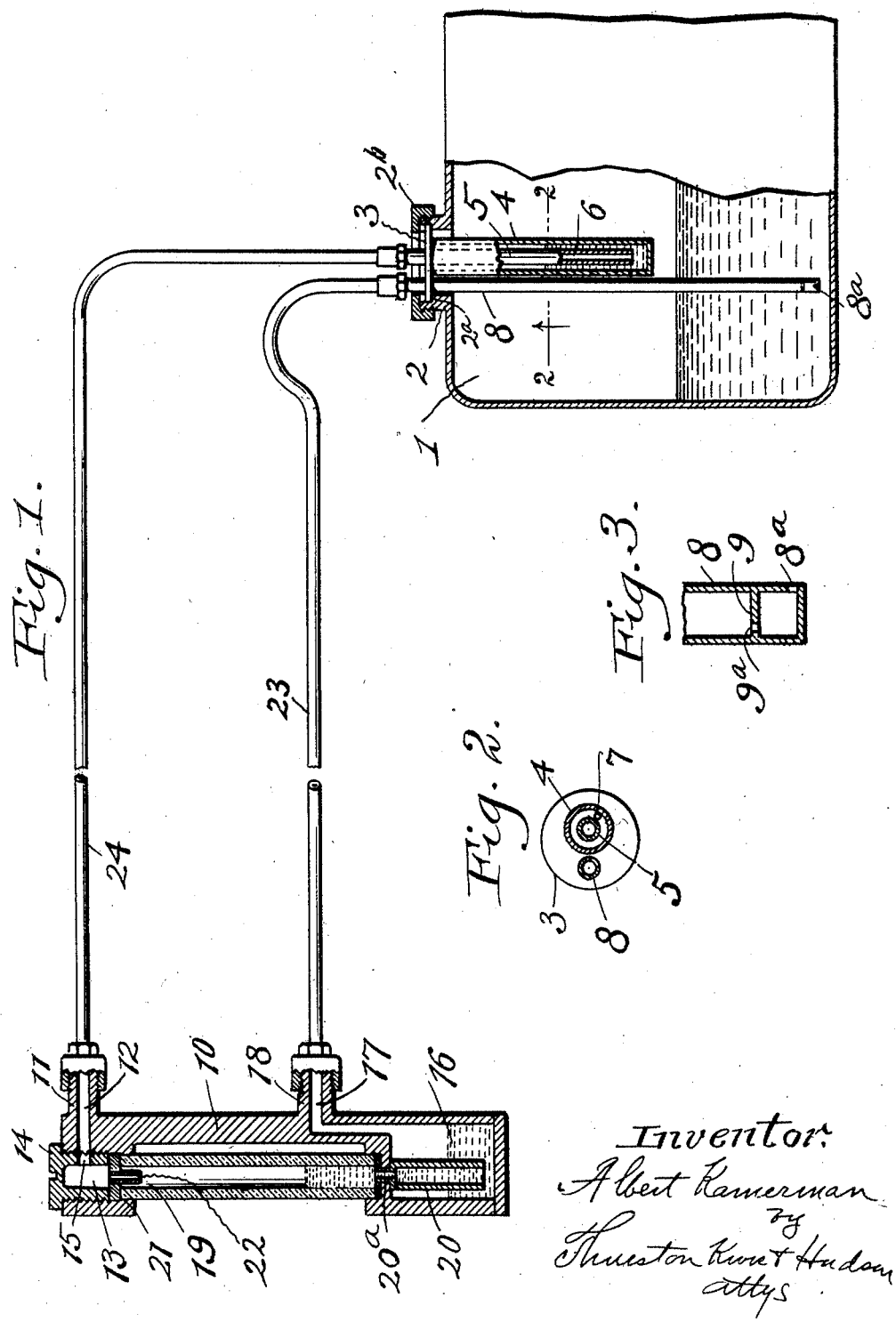

Patented Jan. 10, 1928.

1,656,068

UNITED STATES PATENT OFFICE.

ALBERT KAMERMAN, OF CLEVELAND, OHIO.

LIQUID-LEVEL GAUGE.

Application filed June 6, 1923. Serial No. 643,621.

The present invention relates to gauges which are intended for use in connection with a container having liquid therein, the gauge being so associated that it will give a continuous and visible reading as to the quantity of liquid within the tank.

The present disclosure of the invention is more particularly adapted for use in connection with motor vehicles, wherein the gauge may be mounted upon the dashboard, or as it is sometimes known, the cowl board of the vehicle, the remaining portion of the gauging outfit being associated with the usual gasoline containing tank. It should be understood, however, that no limitation on the use of the invention is intended by the present disclosure.

One of the purposes of the present invention is to provide a structure in which the angular position in which a vehicle may be placed does not affect the reading of the gauge, as for instance, if the machine is climbing a hill or going down a hill.

Another object of the invention is to provide a structure such that in the movement of the liquid within the tank, the surge thereof will not unduly affect the reading of the visible portion of the gauge.

Reference should be had to the accompanying drawings forming a part of this specification, in which Fig. 1 is an elevation with portions in section of the gauging device; Fig. 2 is a section upon the line 2—2 of Fig. 1; Fig. 3 is a fragmentary view of the end of the pipe within the tank.

Referring to the drawings, 1 indicates a tank containing a quantity of liquid to be gauged. The tank is provided with an upstanding neck portion 2, which is exteriorly threaded, and such an opening as is usually provided with the tanks on gasoline motor vehicles for the purpose of receiving a gauge of a different type than the present one herein.

The neck portion 2 is provided with a shoulder $2^a$, forming a ledge, and this ledge accommodates a circular plate 3 from which depends a tubular member 4, the plate being retained in the neck portion 2 by means of a threaded cap $2^b$ screwed onto the neck portion 2. Extending substantially centrally within the tubular member 4 is a tube 5 which is of less diameter than the member 4, and the tube 5 extends approximately to the bottom of the tubular member 4.

Within the tubular member 4 is a body of liquid, such as indicated at 6, which may be gasoline or any other suitable liquid. The plate 3 is provided with an opening 7 which communicates with the interior of the tubular member 4, so that the chambered portion within the tubular member 4 above the liquid is in communication with the atmosphere, whereas the chambered portion within the tube 5 above the height of the liquid which may be therein communicates with the visible gauge in a manner which will be subsequently described.

The plate 3 has an opening through which extends a pipe 8 which pipe extends substantially to the bottom of the large tank 1. This pipe 8 at the lower end thereof is closed, and there is a small opening, such as indicated at $8^a$ formed at substantially the bottom of the tube. Within the tube and a short distance above the bottom is a partition member 9 which fits within the tube 8, but is provided with a small opening $9^a$ at a portion of the plate 9 which is oppositely disposed with respect to the opening $8^a$.

This construction is provided for the purpose of minimizing the effect on the gauge of the surge within the tank when the tank is used in connection with an automobile, or is on a movable structure.

With the end of the tube open, the surge of the gasoline produces within the pipe 8 not only a static pressure but also a pressure which is incident to the flow of the liquid within the tank, and so produces a false reading upon the visible portion of the gauge.

By using the structure which has been described, the openings $8^a$ and $9^a$ being small, the interior of the tube 8 is subject to the static pressure of the body of liquid within the large tank 1, but the pressure incident to the surge of the liquid is very materially reduced, in fact, to such an extent that it becomes negligible.

The visual indicating portion of the gauge may be located at any distance away from the tank 1, and in a case of a motor vehicle may be conveniently located on the dashboard or cowl board of the vehicle.

The part referred to comprises a body member 10, which has a rearwardly extending nipple 11 through which there is duct 12. This duct 12 communicates with a chambered portion 13 which is formed in the upper part of the body 10. In the particular instance the chambered portion is a hollow nut 14 which has an opening 15 in the side thereof that will communicate with the duct 12 when the nut 14 is at its innermost position.

At the lower portion of the body 10 there is a reservoir 16 with which communicates a duct 17 which is in part formed through a nipple extension 18. The body portion 10 has an outstanding head at the upper end thereof in which the nut 14 is located, and it also has an outstanding part at the lower portion of the body 10 which accommodates the chamber 16. The body portion has an opening in the upper extension which accommodates one end of a glass tube 19, and at the lower portion there is a recessed portion of such diameter as to accommodate the opposite end of the tube 19, and communicating with the recess portion there is an opening of smaller diameter which communicates with the chamber 16.

This opening of smaller diameter is occupied by the reduced neck 20ᵃ of a tubular member 20, which tubular member 20 extends substantially to the bottom portion of the chamber 16.

At the upper end of the tube 19 there is a packing member 21 upon which the end of the nut 14 engages, this packing member being provided with a central opening, and a tubular member 22 extends through such opening. The engagement of the nut 14 against the packing makes air tight the connection between the glass tube 19 and the chamber 13, and the tubular member 22 prevents the collapse of the packing member 21, which might otherwise hinder communication between the chamber 13 and the interior of the pipe 19.

The chamber 16 is adapted to contain a liquid such for instance as gasoline, or any other suitable liquid, and when pressure is induced upon the liquid within the chamber 16 the liquid will rise within the tube 19, and the height of the column of liquid within the tube 19 will bear direct relation to the quantity of liquid that is within the tank 1.

The nipple 18 is connected by suitable air tight connections with a pipe 23 and this pipe at its opposite end is connected with the tube 8 that is within the tank 1. Similarly the nipple 11 is connected with a pipe 24 which at its opposite end is connected with the end of the tube 5 which has heretofore been described.

The pipes 23 and 24 are maintained adjacent each other. They are of substantially the same length, so that the quantity of air which they contain is substantially the same, and by virtue of the fact that they extend parallel and in close proximity to each other the temperature condition of both of the pipes is substantially the same.

As will be understood when a body of liquid is placed within the tank 1, a certain portion of it will rise within the tube 8, due to the static pressure of the body of fluid within the tank 1. This will exert pressure upon the air within the tube 23, compressing it to a certain extent, and causing the compressed air to exert pressure upon the top of the liquid located within the chamber 6, and this pressure will cause the liquid to rise within the tube 19.

The height of the column of liquid within the tube 19 is directly proportioned to the height of the liquid within the tank 1, and may be so calibrated as to indicate the quantity of liquid within the tank 1.

In order to obviate inaccuracies due to rises or fall of temperature, and their effect upon the air within the pipe 23, the pipe 24 is provided, which as before stated, is of the same length and extends adjacent to the pipe 23.

The rise of liquid within the tube 19 will cause a compression of the air above the liquid within the tube 19, and within the pipe 24. This pressure will exert itself upon the top of the liquid which is within the tube 5, causing the liquid to descend within the tube 5, which is of course opposed by the static pressure of the liquid within the tubular member 4, and by the pressure of the atmosphere upon the surface of the liquid which is within the tubular member 4.

Under the above conditions if the device be once calibrated with respect to the tank 1 so as to indicate the contents thereof, then any change of temperature which may affect the pipe 23 will also affect the pipe 24, so that the expansion or contraction of the air within both of the pipes will be precisely the same, and therefore the correctness of the measurement of the liquid within the tank 1 is not affected. With respect to the tubular member 4 and the tube 5, this construction is provided in order to do away with inequalities which might arise due to an angular position of the tank 1. No matter what the angle with respect to the horizontal tubular member 4 may have, the liquid within the tube 6 will not affect the pressure condition within the pipe 24, because even if the tube 5 be in an angular position with respect to the horizontal, there will be as much liquid above the horizontal as there is below the horizontal, so that the displacement is no different than would be the case when it was horizontal, and therefore there will be no difference in the static pressure which is exerted upon the air within the pipe 24.

We have before explained the manner in which the structure at the lower end of the pipe 8 takes care of the increased pressure which may be developed, due to the surge of the liquid within the tank, thereby eliminating substantially entirely the effect of such pressures so that the contents of the pipe is subjected only to the static pressure of the liquid within the tank 1.

Having described my invention, I claim:—

1. In a liquid level indicator, the combination with a tank containing the liquid to be gauged and a U-tube gauge containing a shiftable body of liquid, of a pair of pipes both extending from the tank and connected at their opposite ends through said gauge, one of said pipes having a closed end within the tank and a restricted aperture through which communication is established with the interior of the tank adjacent the bottom thereof for retarding the transmission of pressure from the tank to the gauge, the other of said pipes being open at the end adjacent the tank and having means at said open end to retain a shiftable body of liquid which forms a liquid seal for the open end of the pipe and is subjected on the inner side to the pressure within the pipe and on the outer side to the pressure of the air, said pipes having therein confined bodies of gas, that in the first pipe being between the liquid of the tank and the liquid of the gauge and that in the second pipe being between the liquid of the gauge and the body of liquid at the end of said second pipe, said pipes and gauge forming a continuous passageway through which pressure is transmitted from the liquid at the bottom of the tank to said body of liquid at the end of the second tube whereby the position of the liquid in the gauge will vary as the depth of the liquid in the tank varies.

2. In a liquid level indicator, the combination with a tank containing the liquid to be gauged and a U-tube gauge containing a shiftable body of liquid, of a pair of pipes both extending from the tank and connected at their opposite ends through said gauge, one of said pipes extending into the tank with its lower end adjacent the bottom of the tank, the lower end of said pipe being closed and said pipe having a small aperture adjacent the lower end thereof and a partition in said pipe above said aperture, said partition having a small aperture, said small apertures establishing communication between the interior of the pipe and the interior of the tank but retarding transmission of pressure from the tank to the gauge, the other of said pipes being open at the end adjacent the tank and having means at said open end to retain a shiftable body of liquid which forms a liquid seal for the open end of the pipe and is subjected on the inner side to the pressure within the pipe and on the outer side to the pressure of the air, said pipes having therein confined bodies of gas, that in the first pipe being between the liquid of the tank and the liquid of the gauge, and that in the second pipe being between the liquid of the gauge and the body of liquid at the end of said second pipe, said pipes and gauge forming a continuous passageway through which pressure is transmitted from the liquid at the bottom of the tank to said body of liquid at the end of the second tube whereby the position of the liquid in the gauge will vary as the depth of the liquid in the tank varies.

In testimony whereof, I hereunto affix my signature.

ALBERT KAMERMAN.